Figure 1:
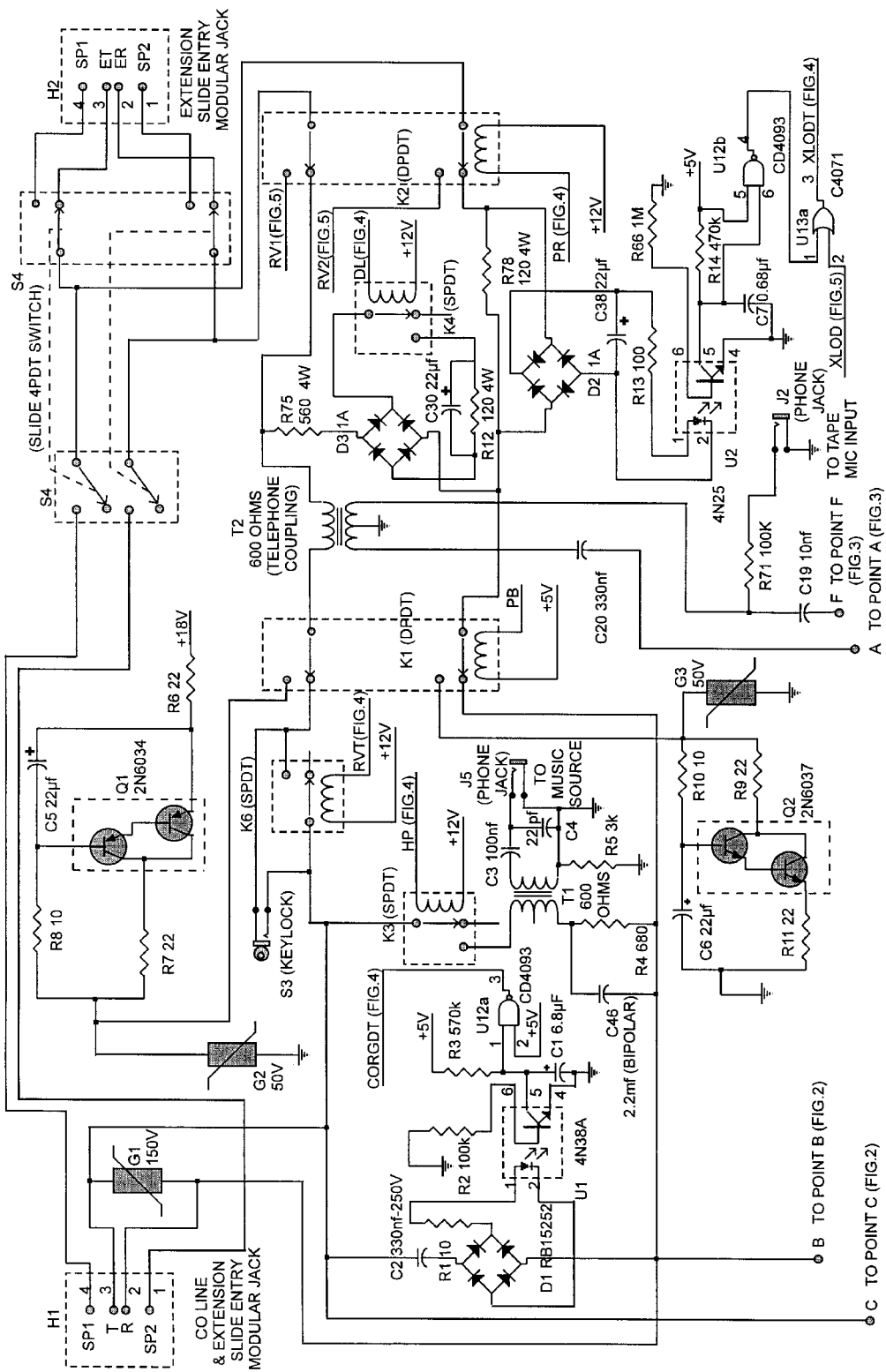

United States Patent [19]
Jean-Claude et al.

[11] Patent Number: 6,078,653
[45] Date of Patent: Jun. 20, 2000

[54] INTEGRATED TELEPHONE INTERCOMMUNICATION AND ALARM ELECTRONIC CONTROLLER

[76] Inventors: Joseph Jean Jean-Claude, 51 Grew Hill Rd.; Frantzy Norma Jean-Claude, 55 Grew Hill Rd., both of Roslindale, Mass. 02131

[21] Appl. No.: 09/064,249

[22] Filed: Apr. 22, 1998

[51] Int. Cl.[7] .............................. H04M 1/00; H04M 9/00
[52] U.S. Cl. ........................ 379/167; 379/162; 379/374
[58] Field of Search .................................. 379/156, 159, 379/160, 162, 164, 166, 167, 168, 170, 171, 373, 374

[56] References Cited

U.S. PATENT DOCUMENTS

| | | | |
|---|---|---|---|
| 4,588,865 | 5/1986 | Hestad | 379/162 |
| 4,631,367 | 12/1986 | Coviello et al. | 379/164 |
| 5,003,587 | 3/1991 | Forbes | 379/162 |
| 5,363,434 | 11/1994 | Farinelli et al. | 379/170 |
| 5,537,465 | 7/1996 | Bellafiore | 379/157 |
| 5,594,788 | 1/1997 | Lin et al. | 379/167 |
| 5,640,448 | 6/1997 | Toyoshima | 379/156 |
| 5,764,746 | 6/1998 | Reichelt | 379/162 |
| 5,774,039 | 6/1998 | Housley | 379/167 |
| 5,887,054 | 3/1999 | Burke et al. | 379/159 |
| 5,912,958 | 6/1999 | Eyran et al. | 379/170 |
| 5,915,014 | 6/1999 | Kakizawa | 379/156 |
| 5,920,616 | 7/1999 | Hazenfield | 379/162 |

*Primary Examiner*—Paul Loomis
*Assistant Examiner*—Rexford N Barnie

[57] ABSTRACT

A telecommunication and alarm system for connection to: a four-wire or two-wire telephone network, a two-terminal doorphone unit, and one or more alarm detectors connected in parallel COMPRISING a line and extension connection for communication with the "tip" and "ring" wires of the incoming telephone line and the service pair of wires enabling in-house plug-in installation of the inventive device; and an alternate extension connection for communication with the "tip" and "ring" pair of the telephone wires leading to the in-house single-line extension telephones;

a plurality of connection modules each equipped with a slide entry plug and a slide entry jack, the plug end of which to be inserted within the telephone wall outlet, and the jack of which to receive the telephone cord of the extension telephone set;

an input connection for unidirectional communication with a two-terminal doorphone unit, from any in-house extension telephone, and means to toggle the direction of speech upon pulsing one same digit on the extension telephone keypad;

means for generating sequencing ring tones to the extension sets and for powering said extensions sets achieving complete intercommunication between said extension sets;

means for detecting tone signals and hook status of the extensions telephones, for detecting ring tones and tone status signals from the external telephone line, and for generating automated tone dialing on the external telephone line;

an input connection for one or various alarm detectors;

an output connection for activating a tape cassette recorder upon off-hook status of any one extension set and for recording the audio signals of the telephone calls;

an output connection for a doorstrike in order for the in-house user to open an entrance door or gate by hitting a key on the telephone set keypad after accessing the doorphone;

computing means to support all hereby operating characteristics automatically and by response to user coded commands input from the extension sets while off-hook.

1 Claim, 6 Drawing Sheets

INTEGRATED TELEPHONE INTERCOMMUNICATION AND ALARM ELECTRONIC CONTROLLER

SUMMARY OF THE DISCLOSED INVENTIVE SYSTEM

The disclosed inventive system is an integrated telecommunication and surveillance electronic controller especially designed to handle residential and business use of one telephone line in a household of up to 6 members or in a small office, while providing a seamless telephone interface to an incorporated security function. Said inventive system renders wholly available telephone communication characteristics proper to sizable Private Branch Exchange equipments and stand-alone telecommunication accessories in one small device which may be easily installed anywhere in a household or a small workplace by the very user. By simply plugging one end of a telephone extension cord to a dedicated jack on said inventive device and the other end of said extension cord to the nearest wall phone outlet, the user completes the basic step required to put the inventive system in operation. Said inventive device makes additionally possible new forms of telephone communication attendance by putting to maximum use the single-line cordless telephone sets and speakerphone sets available in most households and small offices nowadays.

BACKGROUND OF THE DISCLOSED INVENTIVE SYSTEM

For home and small office telephone exchange, two types of equipments are generally made available. One option is the non-Key System Unit (KSU-less) Telephone sets with integrated intercom capability carried out over the very in-house telephone line. Another option is the small Key System Unit which, albeit less costly, requires from the user technical expertise in order to install it and put it in inoperation, contrarily to KSU-less Telephone sets which are plug-and-play devices. In addition, mosts users of small telephone exchange equipments generally face other types of communication needs such as call recording, room monitoring, music on hold, busy-line indication and security control, most of which call for distributed accessories throughout the location. The disclosed inventive system makes available a low-cost KSU system with plug-and-play characteristics (Unit may be plugged anywhere at the location and requires no more than plug-in installation of the extension telephone sets) and provides dedicated interfaces for most of the secondary communication and security control functions.

DESCRIPTION OF ATTACHED DRAWINGS

FIG. 1 of 6: Intercepting Bus

This electrical diagram shows the Intercepting Bus between the Central Office line and the in-house extension telephone sets. The bus carries an Installation Mode Selection circuit, an Incoming Central Office Line Ring Detector circuit, a Hold and Music Source Interfacing circuit, an Audio Coupling circuit, an Automated Dialing Hold circuit, two Electronic Hybrids, a Local Ring Switch, a Loop Status Detector, and an Emergency and Auto-Test circuit.

Figure 2:
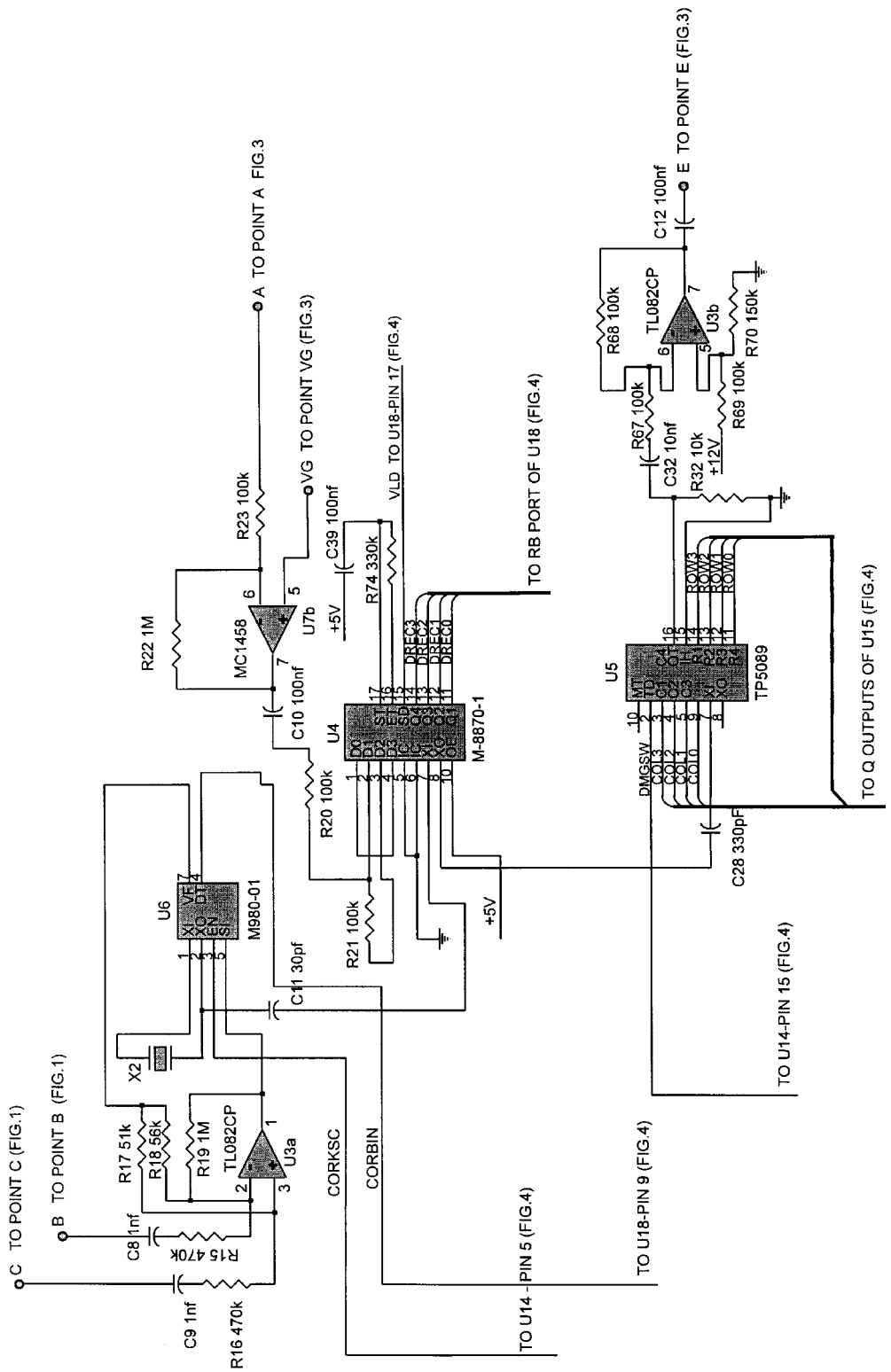

FIG. 2 of 6: Tone Generation and Detection

This electrical diagram shows the tone generation and detection circuitry consisting in a Call Progress Detector circuit, a Dual-Tone-Multifrequency (DTMF) Detector circuit and a DTMF Generator circuit.

Figure 3:
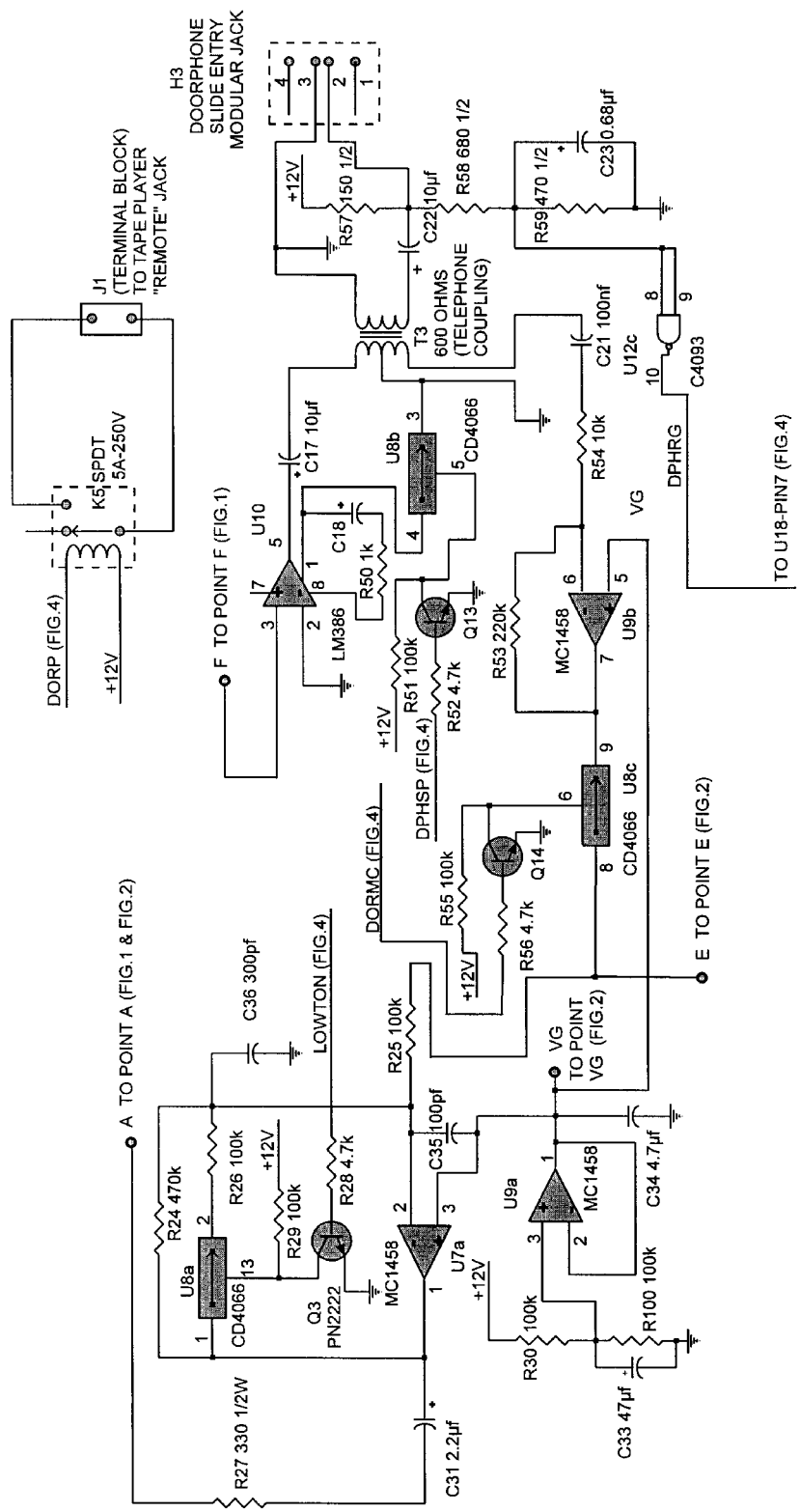

FIG. 3 of 6: Doorphone Audio Channels and Logic Interfacing

This electrical diagram displays the doorphone channel amplifiers and the logic interface to the doorphone module consisting in an Outgoing Audio Channel, An Incoming Audio Channel, a Logic Interface circuit interpreting the calls from the doorphone. Also shown in FIG. 3 of 6 is the Doorstrike Control circuit.

Figure 4:
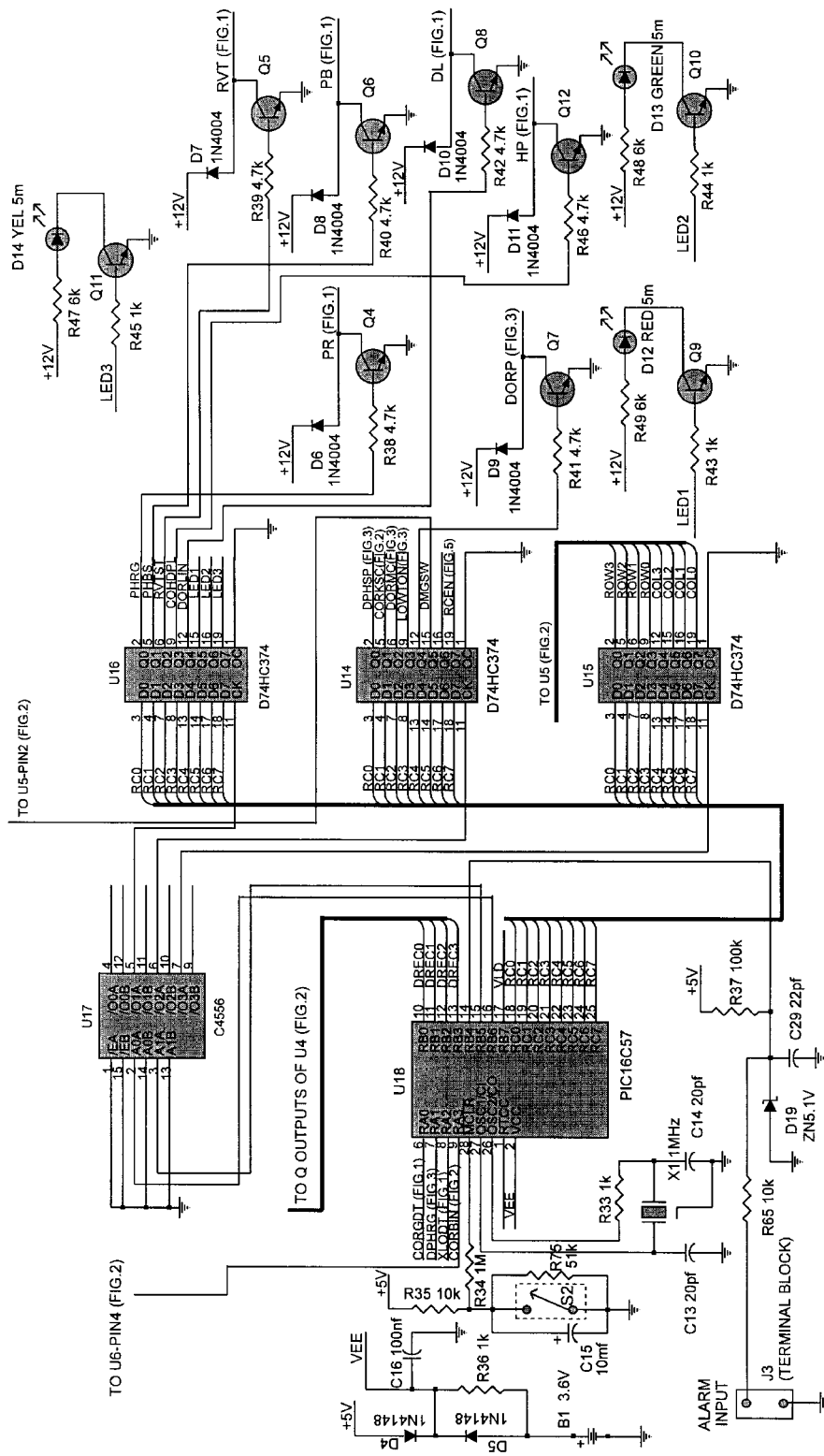

FIG. 4 of 6: Logic Block

This electrical diagram displays the microcontroller and peripheral circuitry of the inventive device, the Relay and Led Drivers as well as the Alarm Interface circuit.

Figure 5:
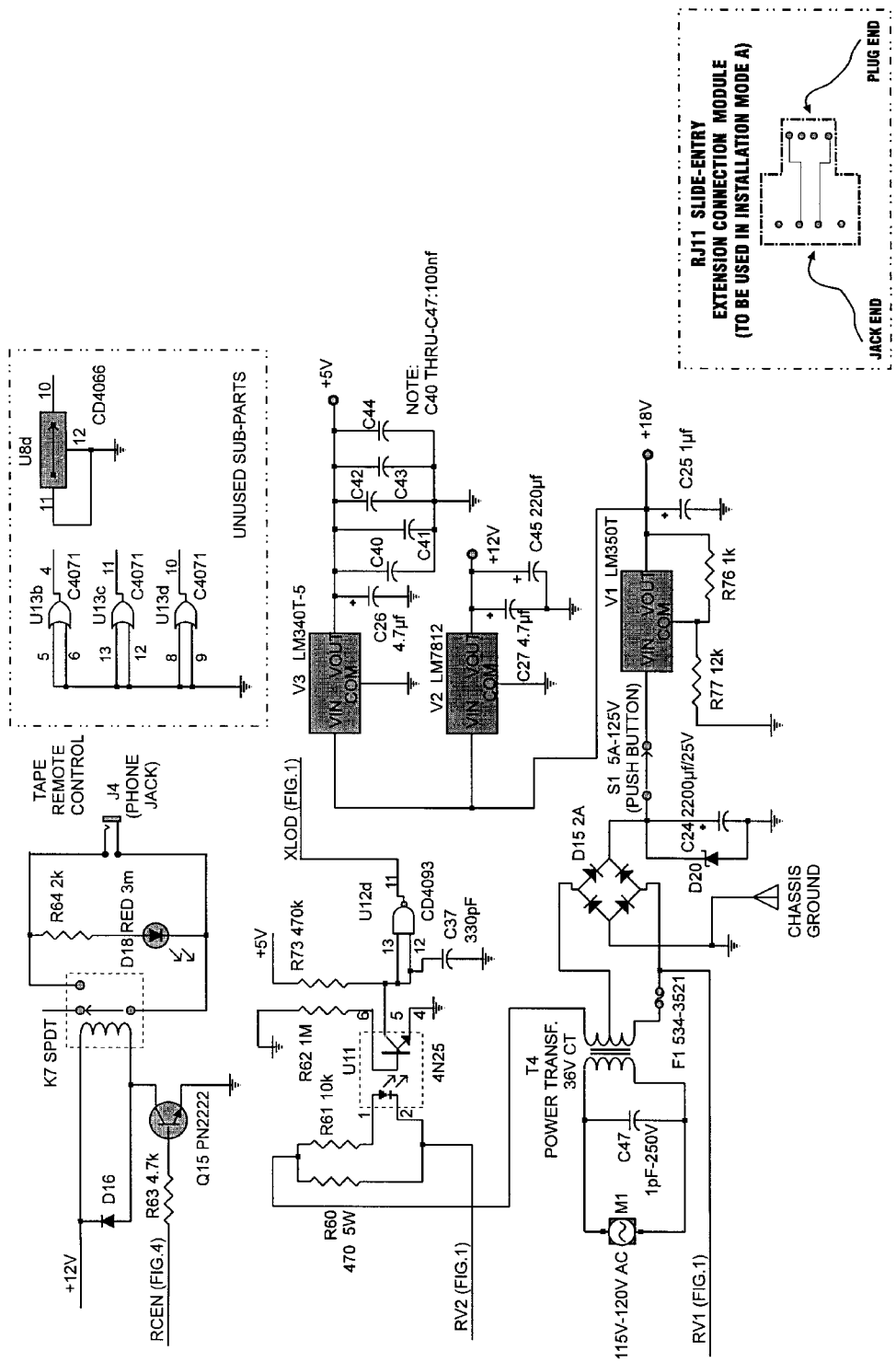

FIG. 5 of 6: Power Supply and Tape Recorder Control

This electrical diagram shows a DC Power Supply circuit, a Local Ring Voltage Generator with its associated Loop Status Detector, and a Tape Recorder Control circuit. This diagram also shows an outline of the stand-alone RJ-11 Slide-Entry Extension Connection Module.

Figure 6:
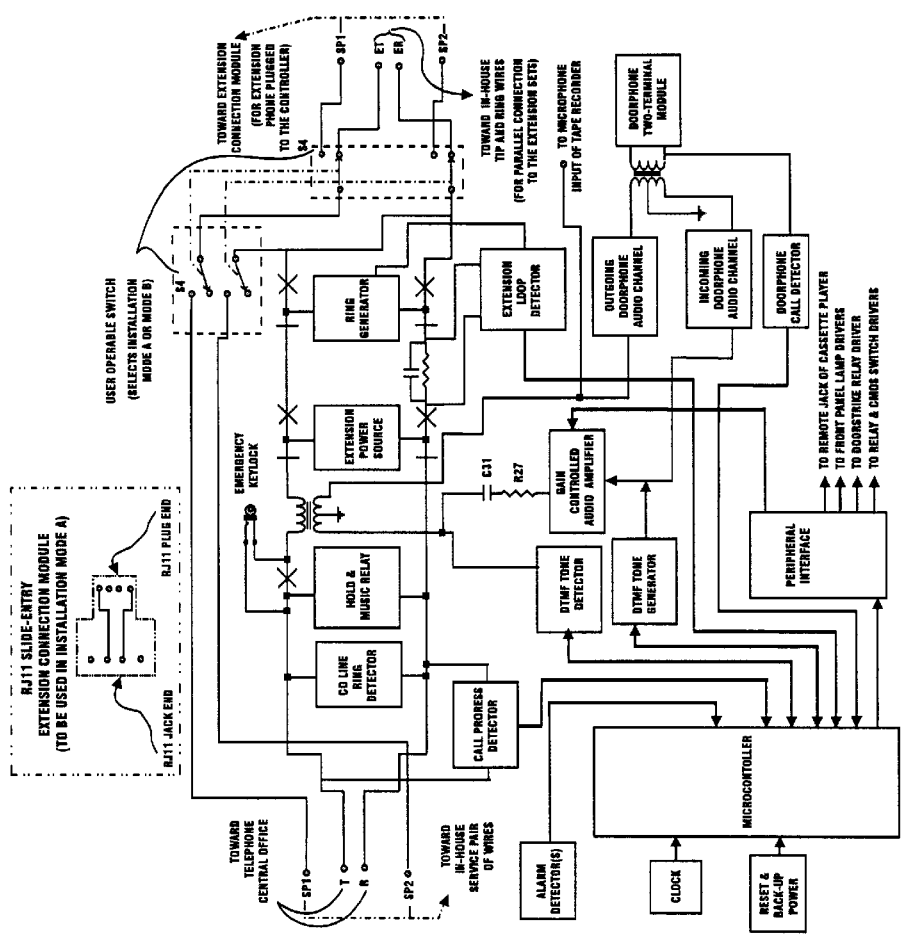

FIG. 6 of 6: Block Diagram

This drawing displays a Block Diagram of the inventive system. It shows a schematic composition of the Controller and an outline of the stand-alone RJ-11 Slide-Entry Extension Connection Module. It is meant to serve as the required illustrative view of the whole invention.

ELECTRONIC HARDWARE DESCRIPTION

In FIG. 1 thru 6, all electrolytic capacitors are marked with a + sign, all others are non-electrolytic. All electrolytic capacitors have a nominal voltage of 25V unless otherwise indicated. All values of resistors are in ohms unless they are followed by the letter k indicating that the value is in kilohms, or the letter M indicating that the value is in megohms. The power rating of all resistors is ¼ watts unless otherwise indicated.

1.—Intercepting Bus [FIG. 1]

1.A.—Installation Mode Selection Circuit

Components: H1, S4, H2, RJ-11 Slide Entry Extension Module [FIG. 6]

H1 and H2 are two slide entry modular jacks, in which extension telephone cords will easily slide. Pins 2 and 3 of H1 are the TIP [T] and RING [R] connections to the Central Office Telephone line, that is the green and red wires of the telephone wiring. Pins 1 and 4 of H1, designated [SP1] and [SP2], are the connections to the service pair of wires, that is the yellow and black wires of the telephone wiring. A 4-wire telephone cord with a RJ-11 modular plug at each tip is used to connect jack H1 to any in-house wall telephone outlet.

H2 is a jack provided for the connection of the telephone set which cord has been removed from the wall outlet in order to realize the connection of jack H1 to said wall outlet. When switch S4 is manually activated, pin 4 of H2 will be connected to pin 4 [SP1] of H1 and pin 1 of H2 will be connected to pin 1 [SP2] of H1, while pins 2 and 3 of H1 are left with no connection. S4 is a Four-Pole Double Trip (DPDT) slide switch. An RJ-11 Slide Entry Extension Connection Module (FIG. 5) will then be plugged to H1 and the of said Module jack will receive the cord of the telephone extension itself. Since the two inner pins of the jack of the module connect to the two outer pins of its slide-in plug, the extension telephone will actually be connected to SP1 and SP2, hence to the service pair of wires (yellow and black). All other distributed extension telephone sets will also use each an RJ-11 Slide Entry Module, which will equally connect them each directly to the service pair of wires. This mode of installation is designated Installation Mode A, an inscription of which is printed on the cabinet of the inventive device at the side of the button of swich S4. The lever is made externally accessible. Thus in Installation Mode A, the user may locate the inventive device at any in-house location sufficiently close to a wall phone outlet to permit the connection of of jack H1 to said wall outlet.

An alternate mode of installation is made available for use when the in-house service pair of wires is unavailable or damaged. This mode is designated Installation Mode B, an inscription which is also printed on the cabinet of the device, and said Installation Mode requires the user to install the inventive device at the utility location where the Central Office line arrives in-house. This mode is entered by setting switch S4 to its second position, which opens the connection between the respective pins 4 of H1 and H2, as well as the respective pins 1 of said jacks. Only the tip [T] and ring [R] pins of H1, and the tip [ET] and ring [ER] of H2 will be in use. The user will open the connection between the Central Office line and the in-house wires (green and red), and connect the Central Office tip and ring wires to [T] and [R] of H1 and the in-house tip and ring wires (green and red) to [ET] and [ER] of H2.

An installation routine in the microcontroller program always conduct a test of the wiring condition upon power up in order to assist the user in installing the device, and to self-protect the inventive device. This testing will be descrided in the foregoing.

1.B.—Central Office Line Ring Detector

Components: G1, C2, D1, R1, U1, R2, R3, C1 and U12a

A varistor G1 is placed across the tip and ring signals to protect the bus against voltage surges from the external telephone network. Bridge D1 ensures that the diode of the optocouple U1, will always be forward biased, independently of the actual polarity of the ring and tip leads. Capacitor C2 ensures Direct-Current (D-C) blocking of the −48V of the Central Office line while, resistor R1 maintains the rectified current within the permissible range of the optocouple. The time constant of R3 and C1 are chosen so that the output (pin 5) of the optocouple will remain saturated in the time frame when the ring signal is off during a ringing sequence output by the Central Office. The saturation spells as a logic 0 on the output of the Schmitt-trigger NAND gate U12A, which is read by the microcontroller as signal CORGDT. Therefore when a ring signal is present on T and R of H1, the optocouple transistor saturates and signal CORGDT remains at logic 0 until the whole sequence of ring signals which follows a remote subscriber's call is off.

1.C.—Music Interface and Hold Circuit

Components: K3, T1, C46, R4, C3, C4, J5 and K6

When a Hold command is received by the microcontroller, it releases relay K6, opening its contacts, and activates relay K3, closing its contacts. A path for current flow is provided to the tip and ring signals through the secondary of Transformer T1 and the parallel RC circuit made up by capacitor C46 and resistor R4, whose values ensure proper impedance matching with the line. At the same time the music signal, alway present on the primary of of T1 is introduced on the line to withold the attention of the remote subscriber. Capacitor C4 will decouple stray signals picked up by the leads of the audio cable connected to the music source. Capacitor C4 and Resistor R5 introduces a high level of attenuation of the music signal in order to prevent possible overdrive of the transformer by the use of high power audio amplifiers.

This Hold circuit is used to put the line on hold on external call transfer.

1.D.—Emergency And Auto-Test Circuit

Components: K6, S3

When the inventive device is turned off, the circuit contacts of relay K6 are open, so that the intercepting bus as a whole become an open circuit. The extension telephones are then electrically disconnected from the tip and ring leads, no matter the installation mode in use. This condition is necessary in order to prevent violation of the stored program toll restrictions by just turning off the inventive device. In case of an actual power shortage, the system manager will optionally restore the Central Office dial tone to the extension telephones by turning the emergency keylock S3 on. A short circuit is then introduced over the circuit contacts of relay K3, restoring the electrical connection. The keylock, which is made externally accessible on the cabinet of the inventive device, will be turned back off by the user after the power resumes.

Relay K6 is also used to perform the installation auto-tests by breaking the Intercepting Bus up into two ends and analyzing what occurs at each end. The processor so verifies the status of the front end of the bus, which is related to the Central Office line, as well as the back end of the bus, which is related to the extension in-house line, deducing wiring conditions and user connections in order to assist the very user during the installation process. This auto-test capability, which is inherent to the initialization of the inventive device upon power up, also protects the latter from operation in inadequate wiring conditions.

1.E.—Electronic Hybrids

Components: R6, C5, Q1, R8, R7, G2, K1, G3, R9, R10, Q2, R11, C6

In order to support intercom communication between the extensions telephone sets, a local bias voltage supply is generated. This voltage, an +18V supply, is fed to the extension telephones through two electronic hybrids. One hybrid is based on a PNP Darlington Q1, and the other on an NPN Darlington Q2. Both circuits are similar and symmetric about the intercepting bus to which they connect through the DPDT relay K1. The hybrids present a low impedance to the DC current allowing a maximum current flow of over 200 mA through the extension telephones when a plurality of these sets go off-hook, while presenting a very high impedance to AC talk signals generated by the extension telephone sets. On intercom calls, relay K1 trips to connect the hybrids to the extension end of the Intercepting Bus, thus providing the extension sets with bias voltage to sustain talk communication.

The hybrids are protected each by a varistor, G2 and G3, against voltage surges possibly picked up by the extension wires, especially when they run outdoors.

1.F.—Audio Coupling

Components: T2, C20 and C19.

Transformer T2, a 600-ohm telephone coupling transformer, allows for interchange of audio signals between the Intercepting Bus and both the doorphone and the tone generator circuit. The Tone Generator interchanges audio signals with the bus through capacitor C20 and one winding of the secondary of T2. The second widing of transformer T2 and capacitor C19 feed the audio signal from the intercepting bus to the input of the outgoing channel of the doorphone circuit.

1.G.—Automated Dialing Load

Components: D3, R75, C30, R12 and K4.

In order to generate DTMF tone dialing on the tip and ring of the Central Office line, a load is needed to simulate a closed loop. The impedance of this load is made up by the primary of transformer T2, resistor R61 and the parallel RC circuit made up by C30 and R12. D13 is only used to maintain the proper bias across the electrolytic capacitor C30. Relay K4 closes or opens the circuit. When the circuit is closed audio transfer occurs between the intercepting bus and both the tone generator circuit or the doorphone channels through coupling transformer T2.

1.H.—Local Ring Switch

Component: K2

A local ring voltage of 36V AC is generated from the power supply, carried to the Intercepting Bus as signals RV1 and RV2, and sequentially switched to the bus through the contacts of relay K2 in order to signal the intercom calls, under the command of the microcontroller. When relay K2 trips, the extensions are electrically disconnected from the front end and the middle portion of the bus and connected to the AC Ring voltage of 36V AC. Relay K2 makes the signal available to the extensions through the Installation Mode Selection circuit.

1.I.—Loop Status Detector

Components: R78, D2, C38, U2, R66, R13, R14, C7, U12$b$ and U13$a$.

Resistor R78 is inserted within the bus to provide a means for current flow detection when the extension loop is closed upon off-hook of any one extension telephone set. Capacitor C38 mounted in parallel with said resistor, provides a shunt for AC signals, and bridge D2 ensures proper voltage bias of capacitor C38. The series circuit made up by the diode of the optocouple U2 and resistor R13 is mounted in parallel with resistor R78 as well as C38. The values chosen for C38, R78 and R13 ensure saturation of the optocouple transitor when a DC current of at least 15 mA flows through the intercepting bus, while remaining non-saturated when a 90V AC ring voltage from the Central Office line flows through the Intercepting Bus. The output of the optocoule is fed to a Schmidt trigger NAND gate, which produces an active signal of logic 1. This output is ORed with the second loop status detector signal to produce the signal XLODT fed to the microcontroller input.

2.—Tone Generation and Detection

2.A.—Call Progress Detector [FIG. 2]

Components: C8, C9, R15, R16, R17, R18, R19, X2, C11, U7$a$ and U6

The operational amplifier U8 and associated passive components make up a common mode amplifier with an extremely high input impedance capable of amplifying signals from the tip and ring leads of the Central Office line with no common ground reference with the line. The output of said amplifier is fed to U6, a call progress detector which releases a pulse upon of tone on/tone off transitions on the tip and ring leads of the Central Office line. U6 is responsive to dial tone transitions, busy tone transitions and high pitch warning tone transitions. The output of U6 is fed to an input port of the microcontroller as signal CORBIN. U6 is enabled by the microcontroller through signal CORKSC.

Crystal X2, oscillating at a frequency of 3.57 MHz, generates the clock needed by detector U6 for its timing analysis.

2.B.—DTMF Tone Detector

Components: T2, C39, R23, R22, C10, R20, R21, U4, and U7$b$

The integrated circuit (IC) U4 is a Dual Tone Multi Frequency (DTMF) tone detector, which outputs a 4-bit binary digit on Q1 thru Q4 for each DTMF tone read. This output is sent as DRECO thru DREC3 to the RB port of the microcontroller. The output signal VLD is active and remains so for as long as the DTMF tone is present at the input D1. This signal is also used by the microcontroller to assess the validity of the output bits Q1 thru Q4. U4 obtains its clock signal from the output of U6 through capacitor C11. The RC circuit made up by C39 and R74 provides proper timing for the tone signal processing undertaken by U4.

The input of the DTMF Tone Detector circuit is taken from the intercepting bus through transformer T2 and capacitor C20, which is connected to point A. The operational amplifier U7$b$ and its associated passive components make up an inverting amplifier with sufficient gain to provide a suitable signal to the input of U4. The non-inverting input of the IC U7$b$ is held at a voltage VG of +6V to ensure that the output audio signal undergoes a complete swing about said voltage.

2.C.—DTMF Tone Generator

Components: U5, U3$b$, C28, C32, R32, R67, R68, R69, R70 and C12

U5 is a Dual Tone Multi Frequency (DTMF) tone generator, which receives its clock signal from the oscillator output of U4 through C28. U5 is enabled by the microcontroller through signal DMGSW output by the latch U14 [FIG. 4]. The COL (Columns) and ROW inputs of U5 form a 4×4 matrix which simulates an ordinary 12-button telephone keypad. The microcontroller generates on port RC two 4-digit words, for each desired DTMF tone, which are latched through U15 to the COL and ROW inputs of U5. It so simulates the push of a button within a 4×4 keypad matrix. The DTMF tone corresponding to number A is used as a confirmation and warning tone signal by the inventive device.

The pull-down resistor R32 is used to extract the output signal from pin 16 of U5. The need of the pull-down resistor of 10 k renders necessary the impedance matching stage that follows. For that matter a unity-gain inverting amplifier is used. The voltage divider at the non-inverting input of U3$b$ ensures proper swing of the output signal which is made available to point E through a DC blocking capacitor C12.

3.—Doorphone Audio and Digital Interface [FIG. 3]

3.A.—Outgoing Audio Channel

Components: U10, C17, C18, R50, U8$b$, R51, R52, Q13, T3, C22 and H3

The audio channel circuits are designed to function with a universal two-terminal doorphone unit. Said unit is known to carry two terminals that are both input and output of audio signals, and at the same time said terminals bring in the power necessary to the proper bias of the active components of the device. Said unit will contain a push-button swich to generate calls, an electret microphone, a low-power speaker, an audio amplifier to amplify the signals picked up by the microphone in order to feed them to the terminals, as well as amplify the incoming audio signal from the terminals before releasing them to the speaker. Said unit will be connected to H3 through a two-wire telephone cord with a slide-in plug.

The audio signal coming in from the intercepting bus arrives at point F, the input of the power amplifier U10. Resistor R50 and capacitor C18 sets the gain of the amplifier. However when pin 1 is pulled to ground, the output of the amplifier is cut off. This condition is used as a means to activate or de-activate the amplifier under the control of signal DPHSP. When said signal is a logic 1, the current flowing through R52 will saturate transistor Q13. Switch U8$b$ will then turn off, relieving pin 1 of U10 from ground. The output of U10 will be enabled and fed to one of the secondary windings of the telephone coupling transformer T3. This signal will reach the doorphone unit through C22.

Capacitor C22 serves the purpose of DC blocking toward the transformer winding. When signal DPHSP is a logic 0, transistor Q13 is cut off, the control pin of the CMOS analog switch U8b goes to +12V, turning the switch on. Pin 1 of U10 then goes to ground and the ouput of U10 is disabled.

3.B.—Incoming Audio Channel

Components: H3, C22, T3, C21, R54, R53, U9b, U8c, Q14, R55, R56, U7a, R25, C35, R28, Q3, R29, U8a, R24, C31 and R27

The audio signal coming in from the doorphone goes through the secondary of transformer T3, passes on to the second secondary winding of the transformer, and reaches the input of the preamplifier U9b through the DC blocking capacitor C21. Resistors R53 and R54 set a pre-amplifying gain for the signal which is fed through the analog swicth U8c to the low-power amplifier made up by U7a and associated components. The switching of U8c is controlled by the signal DORMC and the driver made up by R55, R56 and Q14. When DORMC is at logic 0, the transistor is cut off and the switch turns on; when it is at logic 1, the transistor saturates and the switch turns off. Thus signal DORMC and DPHSP both control the switching of the channels. Both channels can never be on at the same time, so preventing the formation of a closed loop resulting in feedback oscillations. This is accomplished by having both DORMC and DPHSP signals always with the same logic levels, either both at 0 or 1. The toggling of the channels is realized by the microcontroller under user command, which is input from the keypad of the extension telephones.

The power stage of the incoming channel is a gain-controlled amplifier. It is an inverting amplifier with a variable feedback resistance and the resistor R25 as the input resistor. The feedback resistors are R24 and R26. When analog switch U8a turns off, R24 is the only feedback resistor for the operational amplifier U7a. The signal arriving from switch U8c reaches the input of the amplifier and is amplified at a suitable gain ensured by R24 and R25, in order to drive appropriately the coupling transformer T2 of the Intercepting Bus. This condition is used in Auto-Answer Mode of operation, when the system outputs to the extension speakerphones very loud confirmation and warning tones routed to point E from the tone generator. When switch U8a is turned on, both resistors R24 and R29 form a parallel combination, with a resulting lower feedback resistance, and thus a lower amplification. This is the condition used to amplify the doorphone audio signals. The analog switch is put under the control of the logic signal LOWTON through the driver made up by R28, R29 and Q3. Point A is not only an output point for this amplification stage, but is also an input point for the tone amplifier [FIG. 2] picking up signals from transformer T2. Therefore, capacitor C31 and R27 with their specific values of 2.2 microfarads and 330 ohms respectively, ensure that the input of the tone amplifier is not overloaded, while allowing enough power of the audio signal output by U7a to appropriately drive transformer T2. In addition, C31 plays a DC blocking role, isolating the output of U7a. Capacitors C35 removes stray signals from the inputs of U7a.

All of the operational amplifiers used in this inventive device are single-power integrated circuits, contributing in a low-cost power supply. As such, they can only realize a full swing of the audio signals if the cross-over point is well above ground. Components R30, C33, R100, C34 and U9a make up a voltage follower whose output follows the voltage set at its non-inverting input by the voltage divider R30 and R100. No matter the varitations of the voltage supply, nominally a +12V supply, the mid-point of the voltage divider will always be in the mid-range of the supply, hence the output of the voltage follower equally. The voltage at the output of said follower is designated VG, and serves as the ground reference of operational amplifiers in need of such above-ground condition.

3.C.—Doorphone Call Detector

Components: R57, R58, R59, C23 and U12c

Resistors R57, R58 and R59 form a voltage divider. While R57 is needed to supply power to the doorphone module, it takes part in the mentioned voltage divider. In standby state, the voltage drop across R59 is 4V, which is read as a logic 1 by the Schmidt trigger NAND gate U12c. When the button of the doorphone module is hit, an in-module resistor is placed in parallel with with the series combination formed by R58 and R59. The voltage across R59 subsequently drops below 2V and is read by the NAND gate as a logic 0. The output of said gate changes to a logic 1 which is read by Port RA1 of the microcontoller as a call request. Capacitor C23 shunts to ground the audio signals present on the divider.

3.D.—Doorstrike Control

Components: K5 and J1

This circuit is an adjunct to the doorphone circuitry with the aims of providing opening control to an entrance door or gate after a visitor has announced himself or herself at the doorphone module. The strike devive must be connected to J1 in a series configuration so that the contacts of relay K5 open or close the strike circuit.

4.—Computing Processor and Peripheral Interfacing

The overall operation of the inventive device is put under the central control of a PIC16C57 Microcontroller, with an EPROM capacity of 2K×12 and an embedded RAM capacity of 80×8.

4A.—Logic Block

Components: C13, C14, X1, U18, U17, U16, U14 and U15

The clock signal of the microcontroller is generated from an on-chip circuit in association with C13, C14 and X1, a 1 MHz clock crystal. Said microcontroller possesses three ports, namely port RA of 4 bits, Port RB of 8 bits, Port RC of 8 bits, being all input/output ports. Port RB is used to create a data bus of 8 bits, which will be latched by U16, U14 and U15 to create 24 outputs in order to perform the driving functions. Ports RB5 and RB6 are decoded into 4 bits by the binary 2-to-4 decoder U17. Three of these outputs, Q1A, Q2A and Q3A, corresponding to logic inputs of 01, 10 and 11 on RB4 and RB5 respectively, serve as the selecting clock signals for the three latches. Logic state of 00 on RB4 and RB5, is set as an idle state where no latch is selected. The output bit Q0A, corresponding to this input condition, is consequently left unused.

Ports RB and RC of the microcontroller are used exclusively as output ports, except for RB7 and RB4 which are used as inputs. Port A is exclusively used as an input port.

The reset circuit of the microcontroller is made up by R35, R34, R75, C15 and S2. Upon power up, the time constant of by R35 and C15 introduces a short delay in the rising of the voltage on the reset pin MCLR. Since said reset input operates by negative logic, upon power up even though the +5V supply will be present on its power pin 2, the microcontroller will not initialize until the reset voltage overshoots 3V. This ensures initialization of the microcontroller only after the logic power supply has reached its nominal value of +5V. The supply voltage of +5V reaches the power pin 2 of the microcontroller through diode D4 as VEE.

When the power supply is turned off, capacitor C15 will discharge through R75 in 5s, resetting the microcontroller. S2 is a service switch, not accessible to the user, allowing to reset the microcontroller while the power is on. While the power supply is off, the microcontroller will still be fed by the back up battery B1 of 3.6V/280 mAh through D5, in order to saveguard the user-programmed data stored in RAM. Resistor R36 allows the battery to charge while the power supply is on.

The EPROM stored program of the microcontroller is structured so as to capture all of the hardware peripheral events and at the same time carry out the execution of the user commands, integrating in time reception of multiple orders and their execution, that is with no user detectable delay in any response.

4.B.—Drivers

Components: R47, D14, R45, Q11, D7, Q5, R39, D8, Q6, R40, D10, Q8, R42, D11, Q12, R46, R48, D13, Q10, R44, D6, Q4, R38, D9, Q7, R41, R49, D12, R43 and Q9.

The inventive device is endowed with 4 distinct modes of operation which are: Normal Mode, Auto-Answer-Mode, Absence Mode and Programming Mode. The modes are signaled by 3 dedicated leds on the front panel of the device. The driver made up by Q10 and associated components is used to turn on the green led D13 as an indication of Normal Mode of operation. The driver made up by Q11 and associated components is used to turn on the yellow led D14 as an indication of Auto-Answer Mode of operation. The driver made up by Q9 and associated components is used to turn on the green led D12 as an indication of Absence Mode of operation. The Programming Mode of operation is indicated by all three leds turned on.

The other drivers made up by Q4, Q5, Q6, Q7, Q8 and their respective associated passive components are all identical and provide for current flow through the coils of all of the relays used in the inventive device. The coils are connected each to the collector of an NPN (PN2222) transitor, in parallel with a pike-suppressing reverse-biased diode. They are all tied to the +12V supply.

4.C.—Alarm Detector Interface

Components: J3, R65, D19, C29 and R37

To connector J3 may be connected one or more normally-open dry-contact alarm detectors. Port RB4 or pin 14 of the microcontroller reads the output of this interfacing circuit. On standby, Port RB4 will read a logic 1 from the output. When any of the detectors is triggered, the input terminal of resistor R65 goes to ground through the detector contacts. The mid-point of the voltage divider made up by R37 and R65, which is in fact the output of the interface, will be set at a logic 0, signalling an alarm alert to the microcontroller. Zener diode D19 shunts to ground all hazard voltages above 5.1V possibly picked up by the wires of the detectors. C29 removes stray signals from the ouput.

5.—Power Supply and Tape Recorder Control [FIG. 5]

5.A.—Tape Recorder Control

Components: R63, A15, K7, R64, D18, Q15 and J4

The "remote" jack of the tape recorder will be permanently connected to the mini jack J4 and the "record" and "play" buttons of such apparatus will remain pressed down. The microphone input of said apparatus must also be permanently connected to audio jack J2 [FIG. 1].

Upon user command, the microcontroller will latch a logic 1 to the base resistor of Q15 in order to activate the tape recorder playing mechanism by shunting the "remote" input of the tape recorder. The transistor will then saturate energizing the coil of relay K7 which closes its in-circuit contacts. The diode D18 will turn off as a result of the shunt. On standby, a small current will flow from the power source residing on the tape recorder through the series circuit made up by D18 and R64, turning led D18 on. This indicator is used for assembly and service purposes.

The audio signal sent to the tape microphone input is picked up from the Intercepting Bus by resistor R71 [FIG. 1]. After a user command requests tape recording to the microcontroller. Thereafter, every time an extension telephone goes off-hook relay K7 will be tripped and upon hangup said relay will be released.

4.B.—DC Power Supply

An AC power cord plugged into an AC wall outlet brings the AC power of 115V–120V to the primary of the 36V Center-Tap power transformer T4. The 18V AC made available between the center tap of one of the secondary terminals of T4 undergo full-wave rectification and filtering by bridge D15 and capacitor C24, converting said voltage into a DC voltage of +22V. Zener diode D20 provides for surge protection, and capacitor C47 for suppression of stray signals from the power line. Fuse F1 protects the supply against current surges. This portion of the power supply remains always energized once the power cord has been plugged. Switch S1 gives the rectified voltage of +22V passage to the regulation stage. In placing the switch between the rectification stage and the regulation stage, the generation of disturbing spikes to the microcontroller and the logic circuitry by the power transformer upon power up is prevented.

V1 is an adjustable voltage regulator whose output is set to +18V by resistors R77 and R76. This voltage constitutes the local bias voltage supplied to the extension telephone sets through the Electronic Hybrids. Said voltage is further regulated to +5V by V3 constituting the supply for the logic circuitry, and to +12V by V2 constituting the supply for the analog circuitry. Capacitor C40 thru C44 are each placed in the vicinity of the logic integrated circuits on the printed circuit board of the inventive device, in order to shunt to ground all possible high frequency logic signals reaching the power supply pin from the integrated circuits. Capacitor C45 is placed in the vicinity of U10 and is intended to provide a minimum of additional power upon the presence of large signal swings at the output of U10.

4.C.—Local Ring Voltage

The local ring voltage is directly provided by the secondary of the power transformer T2. One terminal of the supply is taken after fuse F1. The second terminal from th second lead of the transformer secondary, and is brought up to resitor R60 and R61 in order to create a current flow sensing path. The local ring voltage reaches the Intercepting Bus as RV1 and RV2 through the contacts of Double-Pole-Double-Trip (DPDT) relay K2. This Ring Voltage Supply will provide for a total ringer equivalence number of 10.0. However, since it is a 50 Hz signal, it will not activate the bell of old bell-ring extension telephones. Note that in an actual installation, these extensions phones, if present, may not be required to ring on local calls, due to the specific mode of intercom alerting signal of the inventive device.

The detection of current flow is necessary in other to disconnect the ring voltage supply if an extension telephone goes off-hook while it is ringing. When the current flow is over 200 mA, that is when an extension phone goes off-hook in the ringing phase, the transistor of optocouple U11 saturates turning the output of the Schmidt trigger NOR gate to 1. This signal, namely XLODT, is ORed with the ouput of the extension Loop Status Detector [FIG. 1] before reaching port RA2 of the microcontroller. Capacitor C37 suppresses the spikes generated by the switching of RV2 and RV1.

The unused parts of integrated circuits U13*b* and U8*d* are shown in the upper part of FIG. 5.

USER-ORIENTED OPERATING CHARACTERISTICS

Automatic Testing to Effectively Assist Installation

Upon power-up, the inventive system invariably assesses the condition of the existent in-house telephone wiring. It signals three specific conditions: [a] Absence of dial tone on the tip and ring wires of the Central Office line, [b] overload, that is, excessive number of telephone extension sets—more than 6—connected to inventive device, or grounded wires, and [c] incorrect connections, that is connection of the Central Office line cord to H2, the extension jack, and connection of the extension cord to jack H1, the Central Office line jack.

By generating a sequence of actions in which the microcontroller trips relay K2 in order to open the Intercepting Bus, activates the two Hold circuits sequentially and enables the DTMF generator to send a dial DTMF tone to the Intercepting Bus, and by interpreting the output signal of the Central Office Line Detector and the Loop Status Detector, said microcontroller is capable of assessing the three conditions mentioned above. Thereafter the microcontroller casts the test results to the user by turning the green led on sequentially. If said led turns on only once in a sequence, this is an indication of an absence of dial tone on the tip and ring terminals of jack H1. If the green led flashes twice in a sequence, it is an indication of overload. If the green led flashes three times in a sequence, it is an indication of incorrect or reverse telephone cord connections between jack H1 and jack H2.

In the event that no problem is found, the green led, which is the Normal Mode indicator, will turn permanently on and a ring tone output to the extension telephone sets for 10 seconds. In case faulty conditions are detected, the user will take appropiate corrective action or install the device in Mode B rather than Mode A as might be convenient. The inventive system so assists the user effectively in completing the installation of the device. Mode A is the default installation mode.

Operation with Standard Single-Line Telephone Sets

The inventive system requires no proprietary telephone sets as extensions stations. It will function with all kinds of modern single-line telephone sets equipped for tone dialing and tone ring. The system is only semi-compatible with old bell-ring phones, which will not ring on internal calls, although they may not be required to do so. All user commands are generated by dialing [#], as the command generator, and a two digit code beginning by 7 or 8, except for intercom call commands.

In order to generate an internal call, the user lifts the handset, dials: [#]+[X], and hangs up; X is a digit from 1 to 6, identifying a specific user. A sequence of rings will follow spelling the I.D. number dialed. The sequence will repeat up to 20 times. When the ring tones have ceased, the caller knows that the addressee has picked up an extension phone. Said caller then picks up the handset in turn to attend to the call.

In processing an internal call, the microcontroller, trips relay K1 as soon as [#] is dialed. In the event of transferring an external call, the user must dial [#] twice. After the first [#] is dialed, K3 is tripped to put the external caller on hold, and K1 is tripped so that the extension telephone is now powered by the local bias voltage of +18V. The microcontroller will screen the output of the DTMF tone detector for the second [#] during for no more than 100 milliseconds. If the tone is detected, relay K1 will be kept tripped. If not, it will be released upon time out. This mode of operation ensures system-to-system compatibility and general compatibility. When two of these inventive systems are interconnected through the public switch, the tone detector of one system will also respond to tone signals originated from the remote system. Hence, this mode of operation prevents undesired interference between both systems and ensures thorough system-to-system compatibility. Said mode of operation also ensures compatibility with private communication switches which, when accessed through the public switch, require the the subscriber to dial the [#] key within a string of digits, as is the case in direct inward dialing. In the latter event, the inventive system will put the call on hold and disconnect the extension set from the CO line; however, since no further [#] is dialed, the connection to the line will be reestablished within 100 milliseconds.

The following is a list of user commands:

| Command | Description |
|---|---|
| [#] + [1 to 6] | Intercom calls |
| [#] + [#] + [1 to 6] | External call transfer |
| [#] + [#] + [11, 22, 33 . . . 66] | Automatic (unscreened) external call transfer. The I.D. number is dialed twice by user. |
| [*] | Request for notice of busy release. Notifies termination of ongoing call by a ring tone. |
| [#] + [80] | Busy redial |
| [#] + [81] | Doorphone access. After access is made, pulsing [8] toggles the audio channels, pulsing [1] activates the doorstrike. |
| [#] + [82] + [1] | Enable Tape recording |
| [#] + [82] + [0] | Disable Tape recording |
| [#] + [70] + [yyyy] + [xxxx] | Store the system manager's passcode. [yyyy] is default or former passcode. [xxxx] is new passcode. The letter y or x stands for any of the 12 characters of a standard telephone keypad. |
| [#] + [71] + [xxxx] | Absence Mode activation, [xxxx] is the system manager's actual stored passcode. |
| [#] + [72] + [xxxx] | Auto-Answer Mode activation. |
| [#] + [73] + [xxxx] + [yyyy] | Store 4-digit toll restriction code. [yyyy] is desired 4-digit restricted code. |
| [#] + [74] + [xxxx] | Toll restriction bypass. |
| [#] + [75] + [xxxx] + [y . . . y] | Store the Surveillance telephone number. [y . . . y] is a telephone number of a maximum of 16 digits. |
| [#] + [76] + [xxxx] + [y . . . y] | Store the Doorphone forwarding telephone number. [y . . . y] is a telephone number of a maximum of 16 digits. |
| [#] + [77] + [xxxx] | Activate the absence mode. Alarm surveillance enabled. |
| [#] + [78] + [xxxx] | Clearing all programmed data from memory |

General Paging on Internal Calls

Extension to extension calls are not signalled individually. The inventive system output a 36V ring signal to all of the extensions on internal calls. The fetched party is identified by distinctive ringing (1 to 6 modes of distinctive ringing). Thus general paging is inherent to internal call signalling, allowing to reach the desired party wherever he or she might be around the location. The ID numbers (1 to 6) are assigned but to the users, not to the extensions. Internal calls are easily identified by the number of counts of the tones in a ring tone sub-sequence.

It is up to the user to enable all of the phones or only specific ones around the location to ring. In areas which are not acoustically separated, there will be no need to enable the ring signal of all of the available telephone sets. This makes it possible to install one or two old bell-ring phones if needed, given that they will not usually ring on internal calls when installed.

Complete Hands-Free Operation on External Calls

In Auto-Answer mode of operation the user becomes capable of attending to external calls in a totally hands-free fashion. To enter this mode, one single-line speakerphone is needed. Once it is entered, relay K1 is tripped and remains so as long as the mode is active. The speakerphone is left permanently activated (electronic off-hook). As soon as an external call arrives, it is signalled on the speaker of the speakerphone by two loud warning tones prior to direct and automatic connection of the external caller by releasing relay K1. When the remote caller terminates the call, this condition is immediately detected on the output of the local loop detector by a short pulse going from 0 to 1 and back to 0. The microcontroller then trips relay K1 back releasing the line and powering again the extension speakerphone. While the call is ongoing, the local user may preferably terminate the call on his or her own by hitting the speaker button. To re-enter the mode subsequently, he or she hits the speaker button back.

Busy Redial

The user may order the inventive sytem from any extension set to redial a busy number till the call passes through. After entering the appropriate command, the user hangs up. The microcontroller will then command the Automated Dialing Load circuit to hook the Central Office line by energizing relay K4. The number then stored in memory will be redialed by the DTMF tone generator which will output the tones to the Intercepting Bus through T2. The microcontroller will monitor the call progress by screening the output of the Call Progress Detector. In the event of busy tones, it will redial the number continually. When the call is accepted, it will warn the user by outputting a continuous tone ring for 5 seconds to the extension telephones. Said user will then pick up the handset to attend to the call.

Automatic Transfer of External Calls

When a user receives an external call to be directed to a third party and does not wish to announce the call prior to transferring it, said user may perform an automatic or unscreened transfer of the call by dialing the I.D. number of the addressee twice instead of once. When the third party lifts the handset, the system directly connects the external call and releases the hold.

Call Back Request

Whenever a user lifts the handset and finds an ongoing conversation, he or she may request the inventive system to later announce the end of the conversation by dialing [*] over the ongoing conversation. When the call terminates, the inventive system will warn the user by outputting a continuous tone ring for 5 seconds to the extension telephones This eliminates the need for constantly lifting the handset to check up busy release, or for constantly checking the busy light indicator of the extension phone, if equipped, prior to making a call on a busy line.

Toll Restriction

Once a 4-digit restriction code is programmed, the system will screen all outgoing calls and block any call whose first 4 digit match the programmed code. Only the system manager can override the restriction. Normally, the extension telephone sets operating with the inventive system are set for tone dialing operation, any intent to bypass the toll restriction by switching to pulse dialing will call for immediate blocking of the communication by tripping relay K6 for 500 milliseconds Integrated Alarm An alarm function with a single-detector input is incorporated to the system. More than one detector can be connected in parallel to this input in order to monitor more than one area. After arming the surveillance by entering the Absence Mode code, the user must execute either a dummy or an actual trigger of the alarm, upon which the inventive system will output a confirmation tone ring to the extension telephone sets, and the Absence Mode will be fully entered and signaled by the dedicated lamp. Thereafter, whenever the detector is triggered, the alerting response will follow, said response remaining either local by outputting a relentless ring of the phones (if the surveillance number is cleared) or being channelled outward by reaching a surveillance number, which may be of a security monitoring service if the user contracts one.

Music on Hold

A music input is provided to connect a radio or tape recorder audio output, in order to supply music or to play a pre-recorded message to the callers put on hold.

Tape Recording of Calls

This feature provides external call back up for posterior revising. An audio jack is provided for connection to the audio input of a regular tape recorder.

Room Monitoring

Through the use of two speakerphones, the system manager may accoomplish room monitoring of any area around the location while being able to receive external calls. This feature is inherent to the Auto-Answer Mode of operation. The user will enter the mode and place one of the speakerphones in the area to be monitored setting the speaker volume to low or off. Said user will activate his own speakerphone while turning the microphone off. Audio signals from the monitored area will be constantly sent to the monitoring extension speakerphone. Incoming Central Office calls and doorphone calls will be signaled on said monitoring extension speakerphone. The inventive system also makes possible remote room monitoring by using the handset of a cordless phone (instead of a monitoring speakerphone), which the user may carry outdoors within the tranmission range of the device. Said handset will be set to remain permanently "in use" so that the warning tones for incoming CO line calls can be heard from the earpiece.

Two-Way Doorphone

A distinctive form of ringing, in which the "ring on" phase is significantly longer than the "ring off" phase, signals the calls from the doorphone. The calls can be answered from any extension telephone. The doorphone intercom is handled in a uni-directional fashion: only one person can speak at a time. The direction of communication is controlled by the internal user, by pulsing the [8] button on his telephone set for each transition. The visitor is only expected to speak. During a doorphone call, the internal user may activate at any time the doorstrike controlling the entrance gate or door to give in-house access to the visitor by hitting [1] as many times as necessary. Each strike will last 6 seconds. In Absence Mode the calls from the Doorphone are forwarded to a pre-programmed number (maximum of 16 digits). The forwarding number may be an international/long distance number, a cellular phone number or simply a local phone number. All the related commands can be remotely entered in order to toggle the audio channels, and open the entrance gate.

Warning and Confirmation signals

A warning tone is ouput to the user, that is to the intercepting bus, whenever the following events occur:

[1] An incoming doorphone call while attending to an internal or external call. In this case, the tone is a three-beep tone which is repeated at most twice before the user switches to the new call.
[2] An incoming external call while programming the inventive system. This signal is a three beep tone.
[3] An incoming external call while attending to an internal call. This signal is a three beep tone.

A short confirmation tone follows:

[1] the dialing of the ID number in intercom calls.
[2] the dialing of the [*] after the last digit of a programming data string.
[3] the dialing of the last digit of a function code (8X)

We claim:

1. A telephone line intercepting bus for music-on-hold and auto answer mode with various detection and coupling circuits comprising of a central office (CO) line ring detector and a relay switchable call hold and music interface circuit both placed at a front end of said bus after an entry connector H1, a local loop status circuit at the back end of the bus preceding the ring relay K2, two extension powering electronic hybrids switchable by a double-pole double-trip (DPDT) relay (K1) placed in the mid portion of said bus, a series telephone coupling transformer (T2) following said hybrid DPDT relay (K1) so that it is made possible, on one part, generation of user commands from the extension telephone keypads onto the intercepting bus, said commands being structured such that when the first digit (#), a command generator, is dialed, the extension sets will be disconnected and connected to the powering hybrids while the hold and music interface connects to the CO line if an external call was being attended to at the moment, and if the said (#) is not re-dialed within 100 milliseconds while a previous external call was being attended to, then the previous status resumes ensuring operation guaranteeing specific compatibility to prevent interference based on generated commands; and said automatic answer mode wherein said extension telephone sets will be left permanently on electronic off-hook while powered by the electronic hybrids, incoming CO line calls being detected and signaled through the coupling transformer (T2) by a loud tone on the speaker prior to automatic connection of the extension speakerphone (s) to the line by releasing the hybrid DPDT relay (K1) and termination of the call by the remote subscriber being detected through the loop status detector in order to re-enter a standby status of said mode of operation by tripping the hybrid relay (K1) back.

* * * * *